(12) United States Patent
Markl

(10) Patent No.: US 7,677,349 B2
(45) Date of Patent: Mar. 16, 2010

(54) DRIVE UNIT FOR MOTOR VEHICLES

(75) Inventor: Johann Markl, Nassenfels (DE)

(73) Assignee: Audi AG, Ingolstadt (DE)

( * ) Notice: Subject to any disclaimer, the term of this patent is extended or adjusted under 35 U.S.C. 154(b) by 558 days.

(21) Appl. No.: 10/554,444

(22) PCT Filed: Jan. 24, 2004

(86) PCT No.: PCT/EP2004/000603

§ 371 (c)(1),
(2), (4) Date: Jul. 20, 2006

(87) PCT Pub. No.: WO2004/096596

PCT Pub. Date: Nov. 11, 2004

(65) Prior Publication Data

US 2006/0287154 A1   Dec. 21, 2006

(30) Foreign Application Priority Data

Apr. 25, 2003  (DE) ................. 103 18 742

(51) Int. Cl.
*B60K 17/342* (2006.01)
(52) U.S. Cl. .......................... 180/251; 180/248; 180/249
(58) Field of Classification Search ................. 180/247, 180/248, 249, 11.2, 233, 251; 74/606 R, 74/665 GE
See application file for complete search history.

(56) References Cited

U.S. PATENT DOCUMENTS

| 3,400,777 | A | * | 9/1968 | Hill ............................. 180/249 |
| 4,308,763 | A | * | 1/1982 | Brisabois ................... 74/606 R |
| 4,817,753 | A | * | 4/1989 | Hiketa ......................... 180/249 |
| 4,819,506 | A | * | 4/1989 | Matsumoto .................. 180/248 |
| 5,088,346 | A | * | 2/1992 | Hirabayashi et al. ....... 74/606 R |
| 5,511,448 | A | * | 4/1996 | Kameda et al. ............. 180/247 |
| 5,704,866 | A | * | 1/1998 | Pritchard et al. ............ 180/248 |
| 5,743,156 | A |   | 4/1998 | Watanabe et al. |
| 6,158,303 | A | * | 12/2000 | Shiraishi et al. ............. 180/233 |
| 6,193,629 | B1 | * | 2/2001 | Tenzor et al. ................ 477/124 |
| 6,645,108 | B1 | * | 11/2003 | Gradu ......................... 180/249 |

FOREIGN PATENT DOCUMENTS

| DE | 3418557 | 11/1985 |
| EP | 1120587 | 8/2001 |
| FR | 2 028 634 | 10/1970 |
| GB | 1 003 863 | 9/1965 |

* cited by examiner

*Primary Examiner*—Hau V Phan
(74) *Attorney, Agent, or Firm*—Novak Druce & Quigg LLP

(57) ABSTRACT

The invention relates to a drive unit for motor vehicles, comprising an internal combustion engine, a transmission which is mounted downstream therefrom and is provided with an integrated differential, and a separating clutch that is disposed between the internal combustion engine and the transmission. The differential is driven via a bevel wheel and a bevel-gear drive comprising a drive pinion on an output shaft of the transmission. In order to create a drive unit that is advantageous regarding structure and efficiency, the bevel wheel (48) of the differential (16) is placed laterally from the separating clutch (26) from a vertical perspective and partly protrudes (A) therefrom in an axial direction.

12 Claims, 4 Drawing Sheets

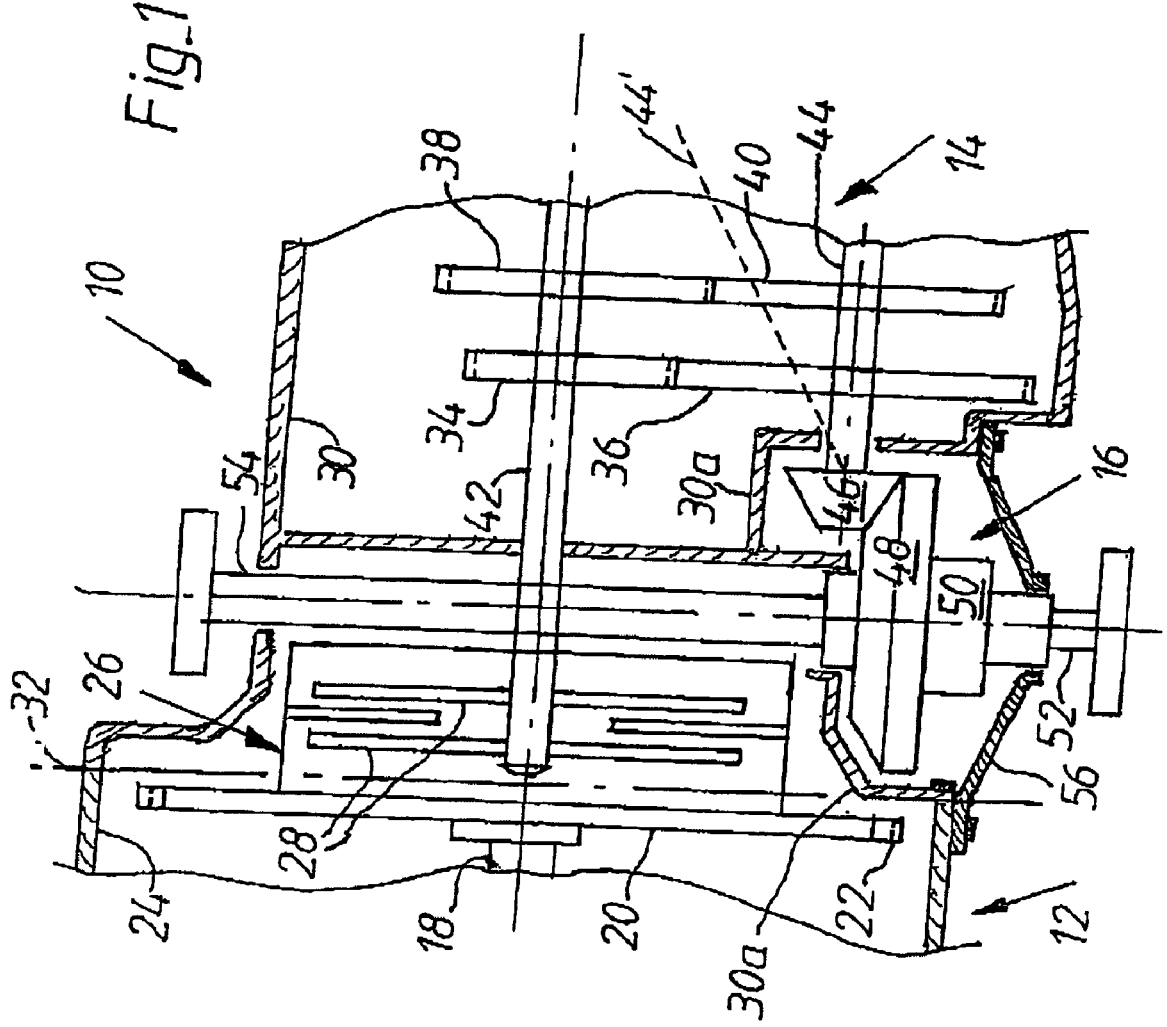

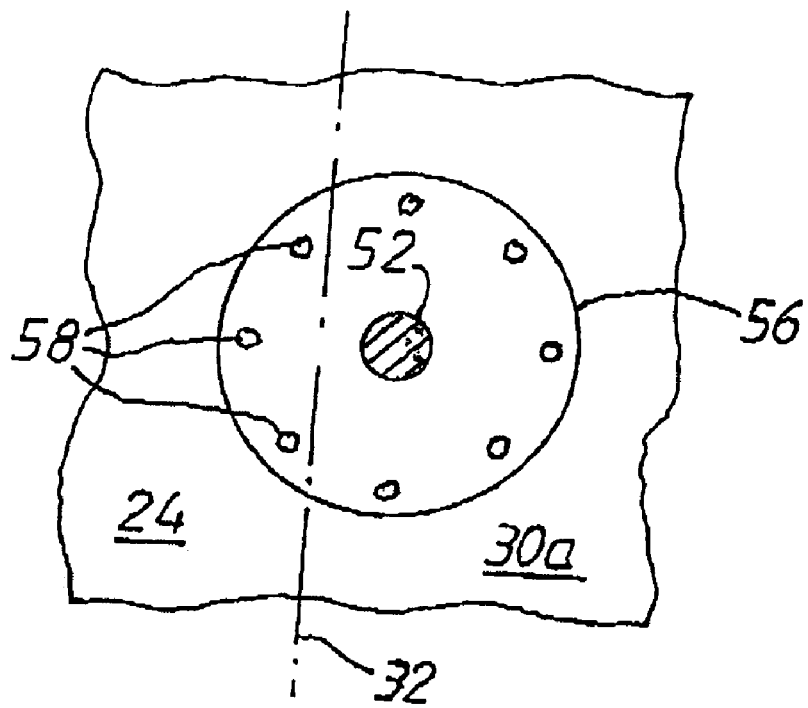
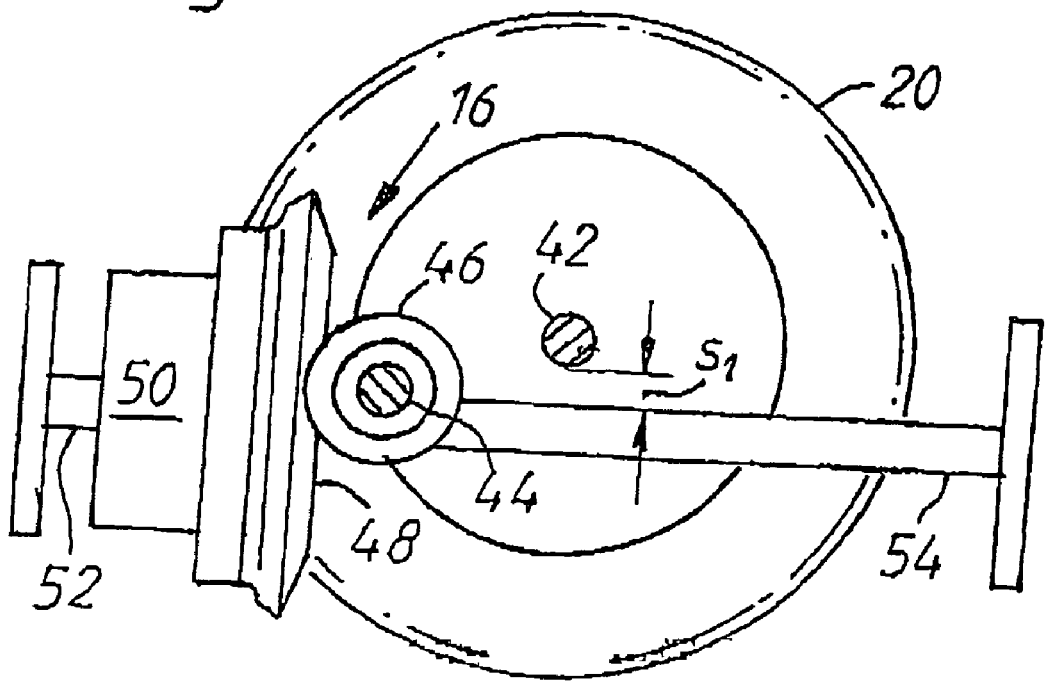

DRIVE UNIT FOR MOTOR VEHICLES

This application is a 371 application of PCT/EP2004/000603, which claims priority from DE 10318742.1, filed Apr. 25, 2003.

The invention relates to a drive unit for motor vehicles according to the preamble of claim 1.

BACKGROUND

Such a drive unit which is installed lengthwise, with a front axle differential which is integrated into the change speed gearbox, is disclosed by EP 1 120 587 A1 for example. Here the differential of conventional design is positioned in the axial direction behind the separating clutch which is located on the crankshaft of the internal combustion engine, yielding a specific overhang of the internal combustion engine which is defined by way of the axes of rotation of the driven front wheels of the motor vehicle and yielding a corresponding weight distribution. It is within the scope of structural conditions to try to dimension the indicated overhang as small as possible.

DE 34 18 557 C2 furthermore discloses a drive unit in which the differential is located in front of the separating clutch in the axial direction; however this solution entails considerable structural complexity, due for example to the significant lateral offset of the output shaft of the change speed gearbox which drives the differential, and by one axle shaft of the differential having to be routed through the oil pan of the internal combustion engine.

The object of the invention is to propose a drive unit of the generic type which with only little additional construction effort permits shortening of the drive unit, particularly of the distance between the engine/gearbox flange and the axle differential, or makes possible an additional installation space for clutch-side powertrain parts.

SUMMARY OF THE INVENTION

This object is achieved in the invention. The solution can be used both for front-wheel drive and also for rear-wheel drive. Advantageous developments of the invention are described by the other claims.

The ring gear of the differential of the invention as viewed from a vertical perspective is mounted laterally from the separating clutch and projects partly over it in the axial direction. With the proposal as claimed in the invention the drive unit is significantly shortened and the differential with the outgoing axle shafts is advantageously displaced forward, by which the indicated overhang is reduced and a more uniform weight distribution of the motor vehicle is achieved. Alternatively the installation space gained in the axial direction can be used for example for additional installation of a starter-generator device.

In one advantageous development of the invention the differential case comprising the axle bevel gears and planet gears can also be positioned laterally next to the separating clutch. This results in that at the minimally necessary lateral offset of the output shaft of the change speed gearbox the separating clutch and the ring gear with differential case can be positioned next to one another and can be operated without adversely affecting their function.

The separating clutch can advantageously be a multidisk friction clutch of conventional design which is small in radial extent. The multidisk friction clutch can be a wet or dry friction clutch, a two-disk dry clutch, for example, with a diameter reduced proportionally to the increased friction surface.

Furthermore, the differential housing of the differential of the change speed gearbox can be built partly around the separating clutch, the flywheel of the internal combustion engine which bears the separating clutch projecting radially over the ring gear. Thus an especially advantageous "internested" design is produced in which the flywheel of the internal combustion engine with the starter gear rim for the starter can remain essentially unchanged structurally, while the separating clutch is modified accordingly.

Furthermore, the differential housing can be designed especially advantageously in part by the adjoining housing of the internal combustion engine and/or the integral housing cover which laterally covers the differential can also partly cover the housing of the internal combustion engine. In addition to a structure which is especially well-suited to casting, this results in additional stiffening of the drive unit in the area of the screw connection between the internal combustion engine and the adjoining differential which is integrated into the housing of the change speed gearbox.

An embodiment is also possible in which the integral housing cover roughly overlaps the engine flange and the housing cover in the longitudinal direction of the gearbox is braced by means of bolts relative to the engine flange (by means of bolting).

The change speed gearbox can furthermore have a shaft configuration with an input shaft and an output shaft which bears the drive pinion for driving the differential. This yields an especially advantageous gearbox design of simple structure with favorable transmission efficiency due to reduced engagement of teeth; a third shaft, for example a countershaft, can be omitted accordingly. The drive pinion is dimensioned so that an exactly defined, predetermined distance between the input shaft and the output shaft can be set.

Here the input shaft and the output shaft can be aligned for example so as to be axially parallel. In one alternative embodiment the input shaft and the output shaft can run obliquely to one another at least in individual areas, so that the drive pinion and the ring gear of the differential are designed for example as beveloid gears so that the output shaft runs in the direction toward the input shaft. Thus the distance between the input shaft and the output shaft can be reduced, and this measure can additionally lead to keeping the length of the gearbox short. That is, depending on the desired distance between the input shaft and the output shaft, either the diameter of the drive pinion is chosen to that effect, the drive pinion and the ring gear can be made as beveloid gears, or a combination of the two in the change speed gearbox can be implemented.

In particular, for an axially parallel execution of the input shaft and the output shaft, the axial distances between the input shaft and the output shaft can be advantageously increased proportionally to produce a large lateral offset. Moreover radial enlargement of the corresponding gear sets optionally makes possible a further reduction in the overall length of the change speed gearbox, even if it does not affect the indicated reduction of the overhang. On the other hand, by reducing the axial distance by for example a "longer" bevel gear, for example a larger drive pinion, and the concomitant reduction of the distance between the input shaft and the output shaft however a shorter speed-transforming transmission can be achieved, if this is desirable.

Furthermore, one axle shaft of the differential can advantageously extend below the input shaft of the change speed gearbox and to the other output side of the differential in the axial direction closely following the separating clutch. Furthermore, the output shaft can be pivot mounted laterally in relation to the input shaft so that the indicated axle shaft intersects the input shaft closely below or above it. These measures contribute both to an optimum shortening of the drive unit which is possible within the scope of structural conditions and also to improved ground clearance of the motor vehicle.

One embodiment of the invention is described below with further details.

The attached drawings are in diagrammatic form wherein

BRIEF DESCRIPTION OF THE DRAWINGS

FIG. 1 shows a front drive unit for motor vehicles with an internal combustion engine which is only suggested, a partially illustrated change speed gearbox with an integrated differential and a multi-disk friction clutch in a top view;

FIG. 2 shows a side view of the housing cover of the differential in the area of the separating plane between the internal combustion engine and the change speed gearbox;

FIG. 4 shows the configuration as shown in FIG. 3 in a view corresponding to the arrow X.

DETAILED DESCRIPTION OF THE INVENTION

Figure 2A:
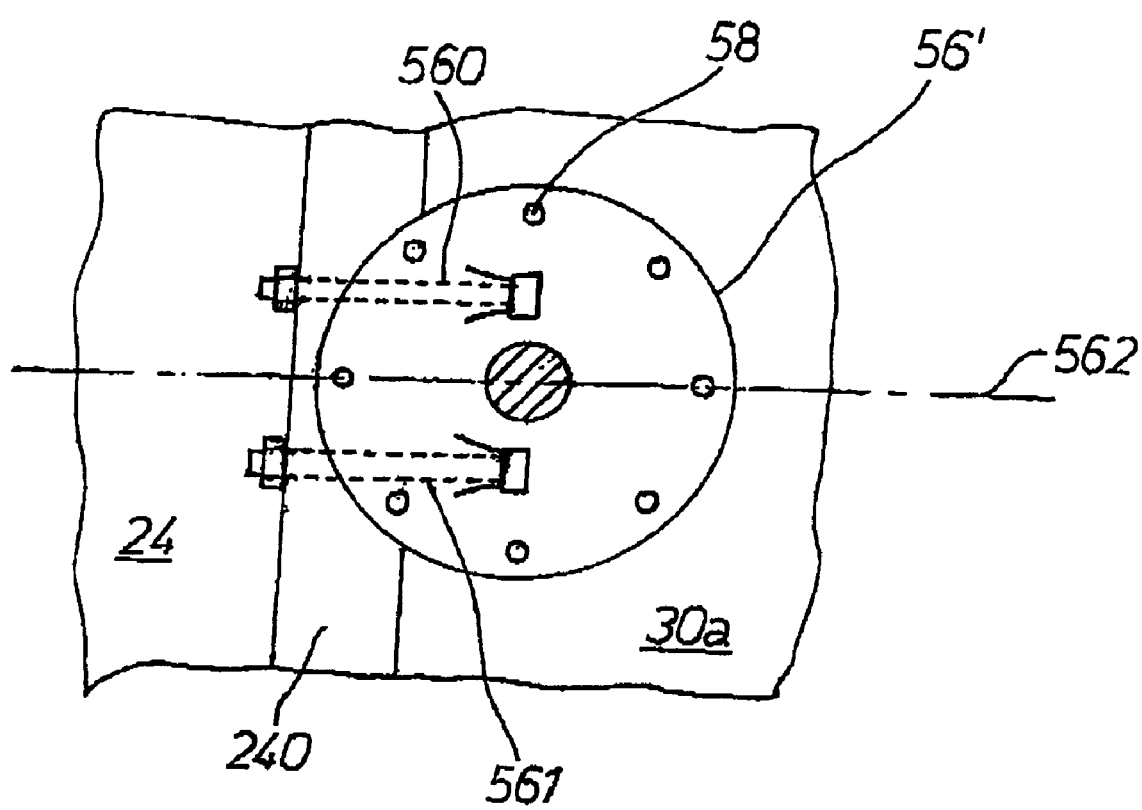
FIG. 2a shows a side view of the housing cover of the differential in the area of the engine flange between the internal combustion engine and the change speed gearbox.

FIG. 1 shows in highly schematic form a front drive unit 10 which can be installed lengthwise in a motor vehicle, with an internal combustion engine 12 which is only suggested, and a downstream change speed gearbox 14 with an integrated differential 16. The indicated components are described only to the extent that this is necessary for this invention; otherwise the components can be of the design known to one skilled in the art or can correspond to the prior art.

A flywheel 20 with a flywheel sprocket 22 shrink-fitted onto the circumferential side is attached to the crankshaft 18 of the internal combustion engine 12. The crankshaft 18 is pivot mounted in the housing 24 of the internal combustion engine 12 in a manner which is not shown.

On the flywheel 20 of the internal combustion engine 12 there is a multidisk friction clutch 26 as a separating clutch, which in this exemplary embodiment is a double dry friction clutch of conventional design with two friction disks 28. The clutch actuation is not the subject matter of the invention and therefore is not shown. As a result of the two friction disks 28 the separating clutch 26 can be made smaller or with a smaller outside circumference in the radial direction, with an identical or even larger drive transmission output compared for example to a single-disk dry friction clutch.

The housing 30 of the change speed gearbox 14 in the illustrated vertical separating plane 32 is flanged to the housing 24 of the internal combustion engine 12, the housing section 30a of the differential 16 integrated into the housing 30 being made in a manner yet to be described.

The change speed gearbox 14 is a conventional transmission with several gears, for the sake of simplified representation only the gear sets with the gears 34, 35, and 38, 40 being shown for the first and second forward gear of the change speed gearbox 14. For the sake of form it should be emphasized that an axle or shaft of the change speed gearbox for accommodating a reverse gear wheel for the reverse gear of the change speed gearbox 14 is not included in the shaft configuration to be described.

The gears 34, 38 (and others) sit on the input shaft 42 and the gears 36, 40 (and others) sit on the output shaft 44 of the change speed gearbox 14. The gear sets 34, 36 and 38, 40 can be activated by way of synchronizer clutches (not shown) for shifting the transmission ratios or gears of the change speed gearbox 14.

Furthermore, the output shaft 44 bears a drive pinion 46 which meshes with a ring gear 48 of the bevel gear differential 16. The differential 16 in the conventional manner drives two axle half shafts 52, 54 which are pivot mounted in the differential housing 30a by way of axle bevel gears and planet gears (not shown) which are supported in the differential case 50. While the axle half shaft 52 which is shown on the left in the drawings is routed only through the large housing cover 56 of the differential 16, the right half axle shaft 54, crossing the input shaft 42 of the change speed gearbox 14, extends as far as the opposing housing section of the differential housing 30a. In the conventional manner the drive shafts (not shown) which drive the front wheels of the motor vehicle are connected to the axle half shafts 52, 54.

Figure 3:
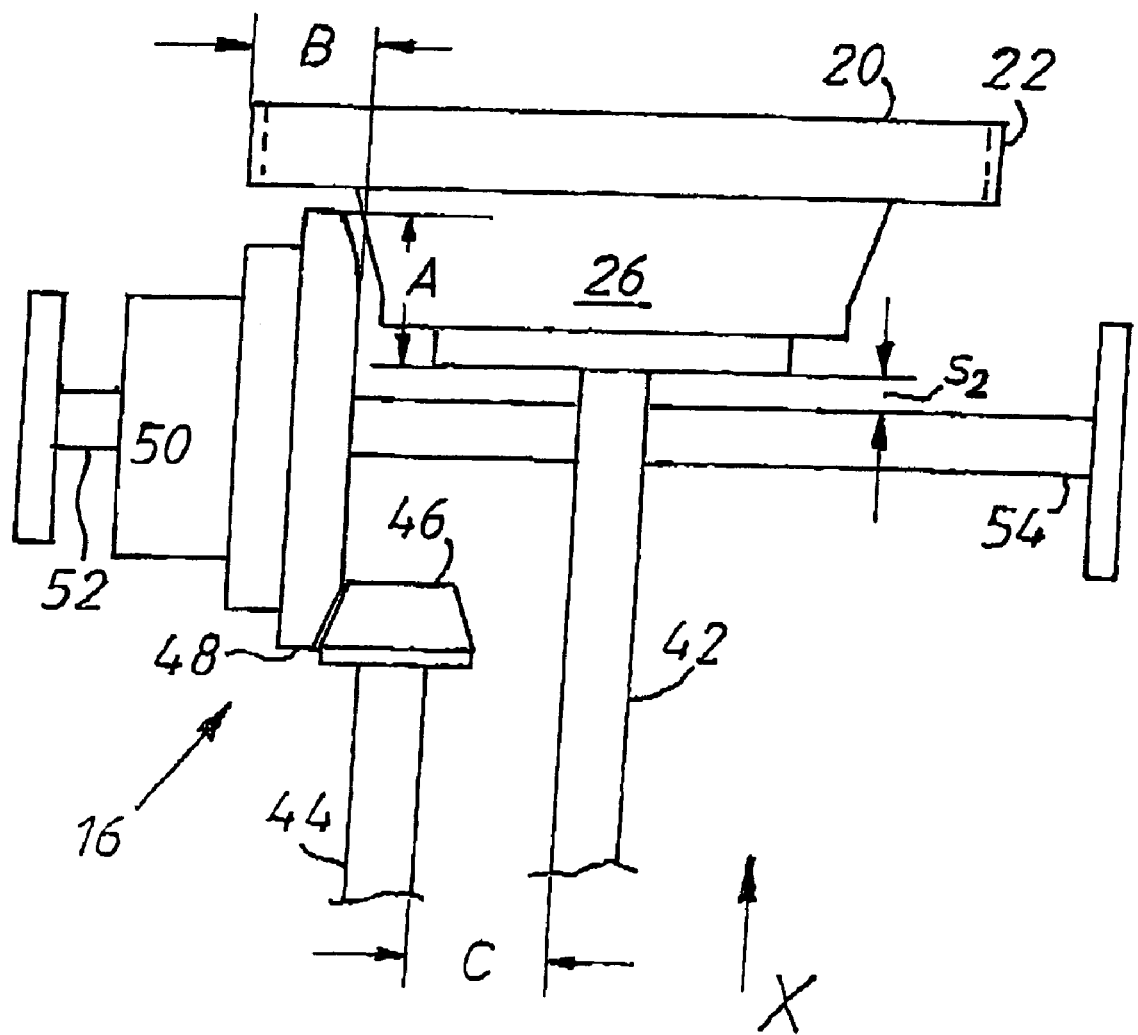
FIG. 3 shows the configuration of the differential, the gearbox shafts and the multidisk friction clutch as shown in FIG. 1, but without the illustrated housing sections.

The input shaft 42 and the output shaft 44 can run so as to be axially parallel, as shown in FIGS. 1 and 3. If a shorter distance (section C, FIG. 3) is required between the input shaft 42 and the output shaft 44 for a certain gearbox design, on the one hand the pinion diameter of the drive pinion 46 can be increased and/or on the other hand the drive pinion 46 and the ring gear 48 of the differential 16 can each be made for example as beveloid gears. The latter measure results in that then the output shaft 44' runs obliquely in the direction to the input shaft 42; this is shown schematically by the broken line in FIG. 1. With known joint pieces (not shown) the output shaft 44' can be moved again into an axially parallel alignment of the input shaft 42 when the desired distance between the input shaft 42 and the output shaft 44' is reached.

As is to be seen in the drawings in FIGS. 1 and 2, the large housing cover 56 of the differential 16 can extend forward beyond the indicated separating plane 32 between the engine housing 24 and the housing 30 of the change speed gearbox 14 so that the integral housing cover 56 projects over the engine housing 24 in sections and is screwed to the latter and to the housing section 30a of the differential 16 (compare FIG. 2, generally with screws designated as 58).

According to another embodiment, the housing cover 56' of the differential 16' can overlap the flange 240 of the drive unit 24. In doing so, connecting means 560, 561 which are inserted lengthwise into the housing cover 56', for example long screws, can be connected (screwed) to the flange 240 of the drive unit 24 (FIG. 2a).

As FIGS. 1, 3, and 4 show, the differential case 50 which holds the axle bevel gears and planet gears (not shown) and the ring gear 48 of the differential 16 are positioned laterally next to the separating clutch 26, and the lateral offset of the differential which is necessary for this purpose can be kept smaller by the reduced outside circumference of the separating clutch 26. Due to the lateral offset in turn the differential 16 can be shifted forward to a greater extent (to the left in FIG. 1), the ring gear 48 projecting in the axial direction over the separating clutch 26 by the section A which is shown in FIG. 3.

Furthermore, as shown in FIG. 1, the differential housing 30a of the differential 16 of the change speed gearbox 14 is built partly around the separating clutch 26, the flywheel 20 which bears the separating clutch 26 with the sprocket ring 22 of the internal combustion engine 12 projecting radially over the ring gear 48 by the amount B which is shown in FIG. 3.

Due to the above described, not overly large lateral offset of the differential 16, furthermore the change speed gearbox 14 can be made with only two axially parallel shaft configurations or with only the input shaft 42 and the output shaft 44 which bears the pinion 46 for driving the differential 16. This means that a third shaft, for example a countershaft, for achieving the required axial distance between the input shaft 42 and the output shaft 44 can be omitted.

Here the gears 34, 36 and 38, 40 (and other gears) are enlarged in diameter for the transmission ratios of the change speed gearbox 14 for achieving the require lateral offset of the differential 16 and the axial distance between the input shaft 42 and the output shaft 44, optionally with the stipulated transmission ratios unchanged. Optionally the gears 34, 36 and 38, 40 and other speed gears can be reduced in width by the increase of the diameter so that an increase of the rotating masses of the change speed gearbox 14 can be avoided and its overall length can be reduced.

The longer axle shaft 54 of the differential 16, as is especially apparent in FIG. 4, extends at a short distance $s_1$ below the input shaft 42 of the change speed gearbox 14 and closely following the separating clutch 26 (compare distance $s_2$ in FIG. 3) to the other output side of the differential 16.

Finally, the output shaft 44 of the change speed gearbox 14, as can be seen especially in FIG. 4, is pivot mounted laterally in relation to the input shaft 42 so that the indicated axle shaft 54 as described above intersects the input shaft 42 closely below the latter (distance $s_1$).

The invention is not limited to the described embodiment. Thus, instead of shifting the differential 16 forward, the acquired installation space can also be used for additional installation of a starter-generator device by means of which the internal combustion engine 12 is started in the conventional manner and optionally the motor vehicle can be electrically driven by way of the change speed gearbox 14 and/or the vehicle electrical system can be supplied with current in generator operation.

The invention claimed is:

1. A drive assembly for a motor vehicle provided with a longitudinally disposed internal combustion engine, comprising:

a change speed gearbox disposed rearwardly of said engine;
a longitudinally torque transmitting clutch assembly disposed between and directly, operatively interconnecting said engine and said gearbox;
an axle differential integrated with said gearbox having a ring gear provided with a portion disposed directly transversely relative to said clutch assembly; and
means for transferring drive from said gearbox to said differential.

2. A drive assembly according to claim 1 wherein said ring gear portion is disposed adjacent said clutch assembly.

3. A drive assembly according to claim 1 wherein a portion of a housing of said ring gear is disposed transversely relative to said clutch assembly.

4. A drive assembly according to claim 1 wherein said clutch assembly is a multidisk friction clutch assembly.

5. A drive assembly according to claim 1 wherein a housing of said differential gear encompasses a periphery of the flywheel of said.

6. A drive assembly according to claim 5 wherein said differential gear housing encompasses a portion of a housing of said engine.

7. A drive assembly according to claim 1 wherein said gearbox includes an input shaft and an output shaft provided with a pinion gear meshing with said ring gear.

8. A drive assembly according to claim 7 wherein said input and output shafts are parallel.

9. A drive assembly according to claim 7 wherein said input and output shafts are laterally spaced sufficiently to position said portion said ring gear laterally of said clutch assembly.

10. A drive assembly according to claim 9 wherein meshing gears disposed on said input and output shafts are provided with sufficiently large diameters to position said portion of said gear laterally of said clutch assembly.

11. A drive assembly according to claim 7 wherein said output shaft of said gearbox is angularly disposed relative to said input shaft thereof.

12. A drive assembly according to claim 1 wherein an axle shaft of said differential is disposed below said input, adjacent said clutch assembly.

* * * * *

UNITED STATES PATENT AND TRADEMARK OFFICE
CERTIFICATE OF CORRECTION

| | | |
|---|---|---|
| PATENT NO. | : 7,677,349 B2 | Page 1 of 1 |
| APPLICATION NO. | : 10/554444 | |
| DATED | : March 16, 2010 | |
| INVENTOR(S) | : Markl | |

It is certified that error appears in the above-identified patent and that said Letters Patent is hereby corrected as shown below:

Col. 6, line 20 after "said" insert --engine--

Signed and Sealed this
Fifteenth Day of February, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,677,349 B2 | Page 1 of 1 |
| APPLICATION NO. | : 10/554444 | |
| DATED | : March 16, 2010 | |
| INVENTOR(S) | : Johann Maerkl | |

It is certified that error appears in the above-identified patent and that said Letters Patent is hereby corrected as shown below:

Title Page; item (12) and (75);
On the face of the patent: the Inventor's name should read, "Johann Maerkl." Please replace the incorrect spelling of the inventor's name.

Signed and Sealed this
Fifth Day of July, 2011

David J. Kappos
*Director of the United States Patent and Trademark Office*